SWITCH SCANNING SYSTEM

Filed Feb. 26, 1963 3 Sheets-Sheet 1

INVENTORS
JERRY S. GOLDFELD
MATTHEW J. RELIS
BY Norbert Ederer
THEIR ATTORNEY

Dec. 20, 1966 — J. S. GOLDFELD ET AL — 3,293,611

SWITCH SCANNING SYSTEM

Filed Feb. 26, 1963 — 3 Sheets-Sheet 2

INVENTORS
JERRY S. GOLDFELD
MATTHEW J. RELIS

BY Norbert Ederer

THEIR ATTORNEY

SWITCH SCANNING SYSTEM

INVENTORS
JERRY S. GOLDFELD
MATTHEW J. RELIS
BY Norbert Ederer
THEIR ATTORNEY

United States Patent Office 3,293,611

Patented Dec. 20, 1966

3,293,611
SWITCH SCANNING SYSTEM
Jerry S. Goldfeld, Paterson, and Matthew J. Relis, Fair Lawn, N.J., assignors to Curtiss-Wright Corporation, a corporation of Delaware
Filed Feb. 26, 1963, Ser. No. 261,051
13 Claims. (Cl. 340—172.5)

This invention relates to apparatus for periodically interrogating in sequence, a plurality of switches to determine switch position status, for storing, updating and processing the status data, and for operating output devices in accordance with the processed data.

Apparatus of the general character contemplated by the present invention is known in the art, an example being United States Patent 2,738,382 of Brooks et al., dated March 13, 1956. This patent discloses a system for periodically scanning telephone lines to determine their current (present) status, for storing the present status data, operating on them in conjunction with previous history status data, and building up a status history of the interrogated line for purpose of signalling a line called or addressed by the interrogated line. The status of an interrogated line is in terms of open or closed condition, and this is in turn determined by the status of respective line switches. Hence the interrogation of lines and switches is synonymous, and may be so considered for purposes of the present invention. The description of the present invention is presented in terms of switch status, for convenience.

The disclosure of the Brooks et al. patent is directed to interrogation of two-position switches. The status of a two-position switch is taken as either "closed" or "open," and the transition from one switching state to the other poses no problem. The "closed" state may arbitrarily be taken as truth proposition, and the fact of switch state transition, either way, is treated as "not closed" or "open." Alternatively, the "open state" may be taken as truth proposition.

The present invention contemplates interrogation of multi-position switches. The term "multi-position switches" is generally used herein to identify generically, switches having two positions as well as switches having more than two circuit controlling positions. However, in the immediately following discussion which is directed to the problems encountered with switches having more than two positions, the term is applicable to the latter type switches. The approach of the present invention is to treat, in the first instance, each position of a multi-position switch as a two-position switch. That is, the present invention contemplates a plurality of switches including both two-position switches and multi-position switches, each having a movable contact and two or more stationary or terminal contacts. With respect to a given contact of a multi-position switch, the truth proposition is engagement of such contact with the movable contact. If such engagement is the fact, the switch is deemed to have assumed the position corresponding to such stationary contact or such contact may be deemed to be "on" or "closed" or in a "true" or "yes" condition.

One important distinction with respect to prior art two-position switch interrogation arises immediately. The fact that a particular contact is not closed or no longer closed cannot be taken to mean that a definite one of the other contacts is closed. In a switching transition, there is a time interval where no one stationary contact may be said to be closed. In the pholosophy of the present invention, nevertheless the last closed contact is still treated as closed, but this of itself is not sufficient. In transferring from one switch position to another position that is not immediatesly adjacent, there will be temporary engagement of one or more intermediate contacts. If the switching action is relatively rapid, there exists the possibility that during one interrogation cycle several positions of the same switch will be reflected as "on." This results in errors in processing, especially so because the output devices of the herein disclosed system may be actuated in accordance with the status data of plural switches, both two-position and multi-position.

The problem raised in the preceding paragraph is solved in the following manner. The system of the invention as a rule treats the "past history" of a multi-position switch as "current history." That is, as a rule, the switch position last previously attained is taken as the present switch position. Switch motion is detected, and in response, on the next interrogation cycle following end of switch motion past history is replaced by current history, for the multi-position switches. The important point here is that so long as switch motion persists, past history is accepted as current history. Accordingly a switch may traverse several intermediate positions, but these will not re reflected as current status because switch motion continues during the traverse. Furthermore, if switch motion occurs while current switch status is interrogated and recorded, there is an immediate reversion to past history.

Dependence, as a rule, on past history data gives rise to the possibility of erroneous noise data being introduced into the system and recorded and perpetuated as true switch status data. To remove this possibility of error, periodically the normal routine is interrupted and the status of the multi-position switches is updated, regardless of whether or not in the immediately preceding cycle a switch had been thrown. Such an updating cycle will be referred to as SMNI (switch motion noise immunity) cycle hereinafter, and similarly aspects of the apparatus or its programs dealing with the SMNI cycle, will on occasion be identified by SMNI. If a multi-position switch is operated during the SMNI interrogation period, there is an immediate reversion to past history data, and the updated data will be sensed during the next interrogation cycle. In this regard, the system operates in the same manner as in the situation where in a cycle, during which updating is attempted, a multi-position switch is operated.

The system of the invention possesses additional advantages; these and other objectives and novel features of the invention will be explicitly stated or will be apparent from the following more detailed specification of which the appended claims form a part, considered together with the accompanying drawings in which:

Figure 1:
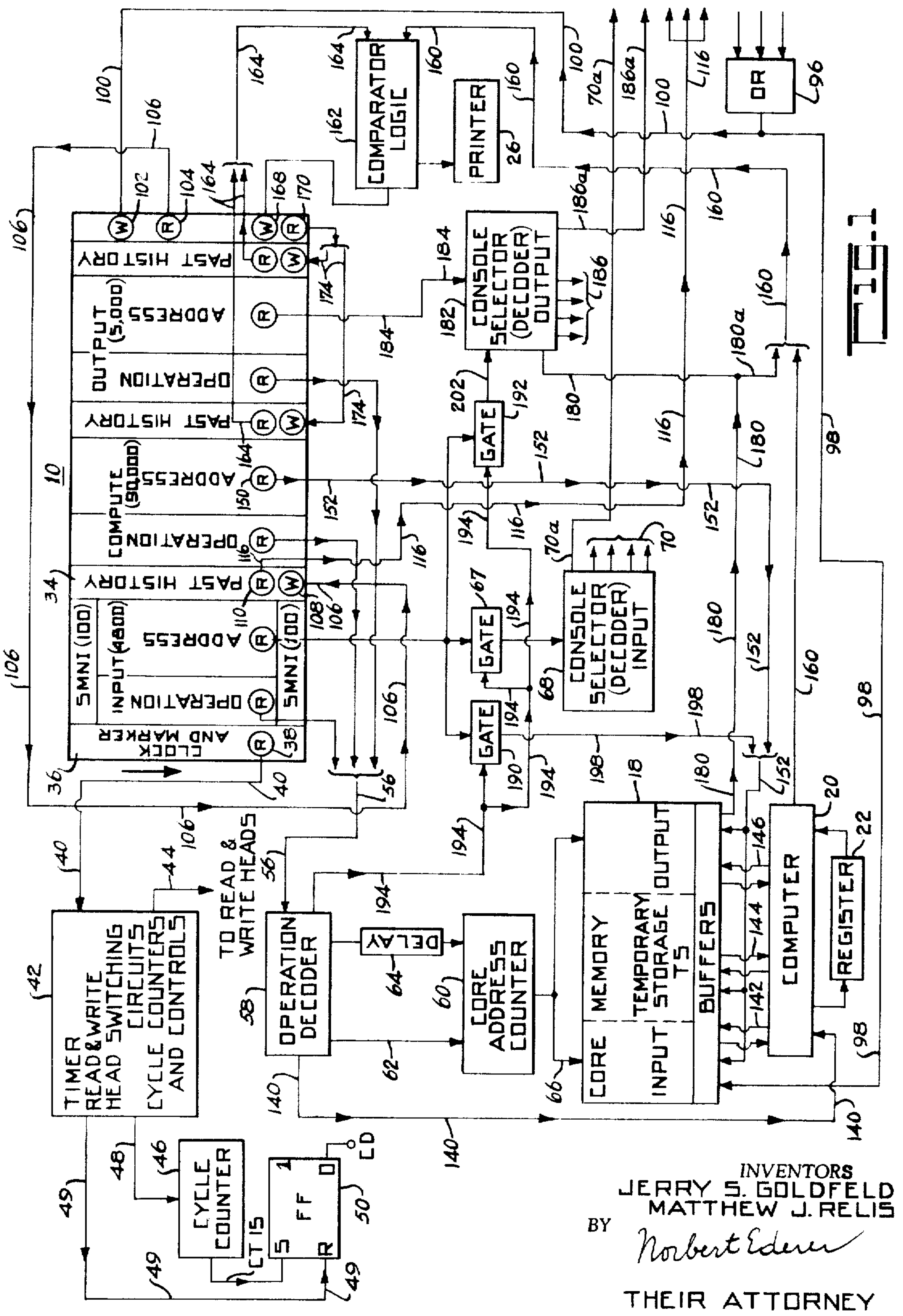
FIG. 1 is a block diagram of programming, computing and storage apparatus which is common to a plurality of "consoles," that is, groups of switches and associated output devices.
Figure 2:
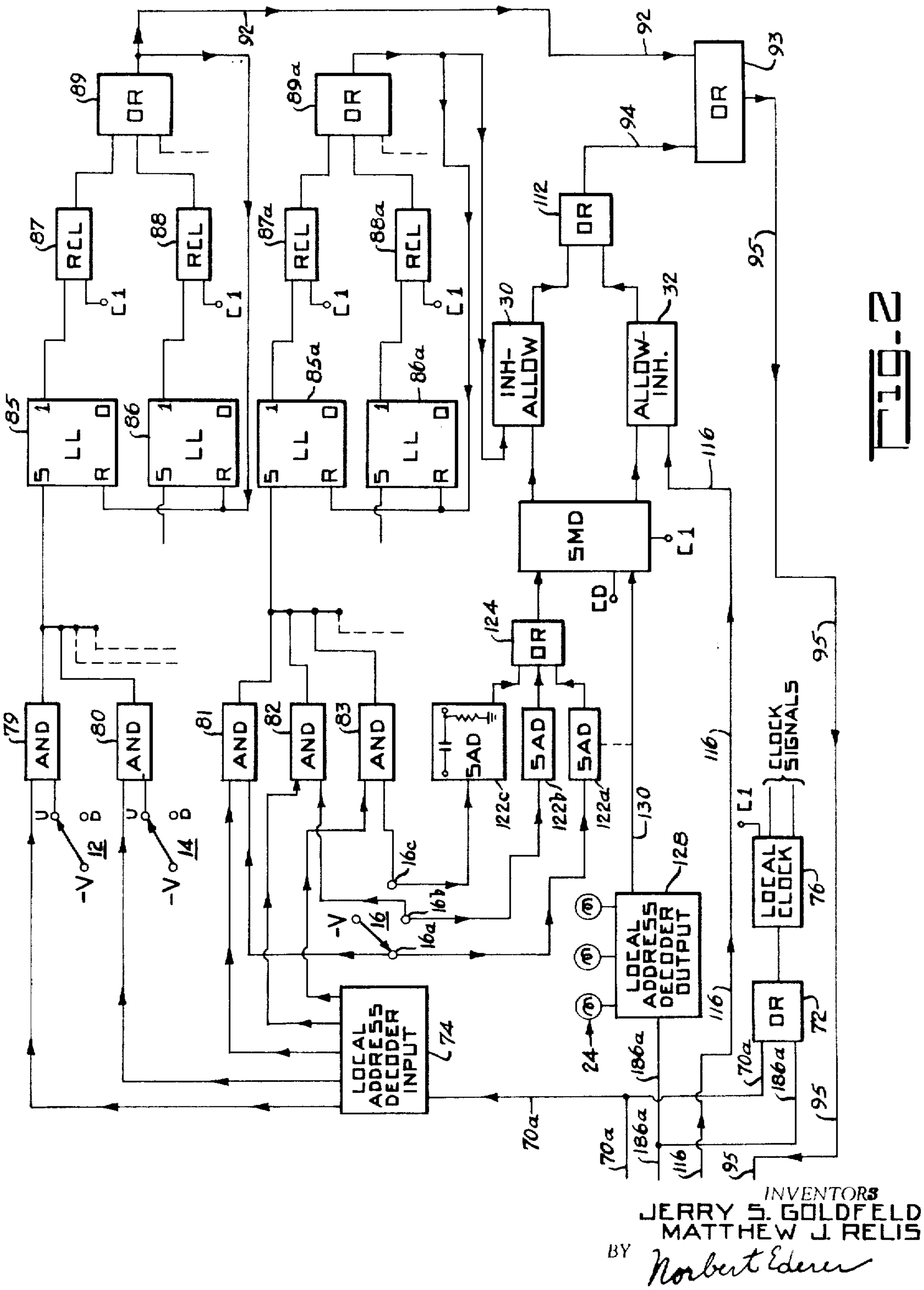
FIG. 2 is a typical block diagram of one console.

A preliminary summary of the overall organizaiton of the illustrated apparatus is presented here, with reference to FIGS. 1 and 2. A rotating magnetic drum 10 (FIG. 1) serves as program storage medium, and is divided into three major sections labeled Input, Compute and Output. In these sections are prerecorded program instructions for the respectively like named phases of an operations cycle. Basically, one complete routine of "input," "compute" and "output" is performed each cycle, and the same is repeated on each succeeding cycle. Periodically, and by way of example here, on every fifteenth cycle the normal routine is interrupted. Instead, and as pointed out in the introductory part of the specification, a SMNI cycle is instituted under control of two smaller drum sections labeled SMNI, one preceding Input and one following it. The SMNI instructions are also prerecorded. During the input part of the program, switches such as 12, 14, 16 (FIG. 2) are addressed in sequence, and in the case of a switch having more than two positions such as switch 16, the individual stationary contacts are also addressed in sequence, under control of the input program. For data storage, a magnetic core memory 18 (FIG. 1) is utilized; it is divided into an Input section, a temporary storage section TS and an Output section. It should be noted that for purpose of data storage a magnetic core memory is favored, although not absolutely esesntial to the invention. Other well known data storage devices may be utilized; similar considerations apply to the selection of a magnetic drum for purpose of cyclical program storage.

During a computing phase of a cycle, under control of the compute section of drum 10, stored data are fetched from memory 18, and transferred to a computer 20, and processed by the latter, and are then transferred to the temporary storage section or the output section of the memory 18, depending upon the instruction. The data subject to processing are accordingly fetched from the input section or the temporary storage section of memory 18. The computer 20 may be comprised of a suitable commercial general purpose computer. However, the computer 20 is not required to perform any arithmetic operations; basically it is merely called on to solve logic or Boolean algebra equations. Also, the compute instruction code is essentially a one address code; essentially each instruction affects only one data bit; and the accumulator register 22 need merely be a one-bit register. Therefore, if desired, the computer 20 may be comprised of a much simpler and less expensive special purpose computer. A description of the repertoire of computer 20, sufficient to execute the commands necessary for the present invention is presented subsequently.

During the output phase of a cycle, the computed and stored output data is transferred sequentially to the respective console addresses. The output or registration devices are mainly indicator lamps, designated as 24 in FIG. 2. The output commands are then essentially to light the addressed lamp, or extinguish the addressed lamp. A command to light a lamp, will indeed light a previously extinguished lamp, but will not affect a previously lit lamp. Conversely, a command to extinguish a previously lit lamp will extinguish it, but will not affect a previously extinguished lamp. Another output device, common to the several consoles is a message printer 26 (FIG. 1), which may be utilized to produce printed record of computations.

With the type of output requirement now in mind, requisite capabilities of the computer 20 will be recognized from the following example. Suppose that a given one of the lamps 24 is to light when switches 12 and 14 are both up (truth value "1") or both down (truth value "0"). Using Boolean algebra notation this proposition may be represented by $$L=S_{12}\cdot S_{14}+\overline{S}_{12}\cdot\overline{S}_{24}$$

During the preceding input phase, the data bit, "1" or "0," pertaining to $S_{12}$ (switch 12) will have been stored at say memory location 365, and that of $S_{14}$ at memory location 366. Locations 365 and 366 are located in the input section of the core memory 18. During the compute phase, the applicable program might be typically as follows; it is assumed that the last previous instruction cleared the contents of the register 22:

(1) "Or" the contents of memory location 365. Comment: This is a non-clearing transfer to the register. If the value of the addressed bit is "1," such bit will now be in the register 22, and also will be retained in memory location 365.

(2) "And" the contents of memory location 366. Comment: This is also a non-clearing transfer. If the register is storing the bit "1" as a result of the above first instruction, and if the bit fetched from memory location 366 is also "1," the contents of the register will now be "1," and otherwise "0."

(3) Transfer the contents of register 22 to temporary storage location 463, clearing the register. Comment: The register is now cleared to "0," and storage location 463 now stores the result computed in the above second step.

(4) "Or" the complement of the contents of memory location 365. Comment: This may be a clearing transfer, if the contents of memory location 365 are not needed further in this computing phase.

(5) "And" the complement of the contents of memory location 366. Comment: This may also be a clearing transfer. The register will now contain the bit "1" if locations 365 and 366 had each stored a "0."

(6) "Or" the contents of temporary storage location 463 clearing it. Comment: This assumes that the valve of $S_{12}\cdot S_{14}$ is no longer needed. Otherwise, this would be a non-clearing transfer. The register 22 now contains the result of the computation, "1" if the conditions of the above equation are satisfied, and otherwise "0."

(7) Transfer the contents of register 22 to memory location 583 (Output section), clearing the register. Comment: During the next output phase, the contents of memory location 583 will be transferred to the appropriate lamp. This will be lit or continue to be lit, if the transferred bit is "1" and will be extinguished or continue to be extinguished if the transferred bit is "0."

The status of two-position switches such as 12 or 14 (FIG. 2) is updated in memory 18 each input phase. The status data for switches having more than two positions, such as switch 16, is reflected by treating each position as a two-position switch as stated in the introductory part of the specification. For switches such as 16, the entry of current status data is normally inhibited by a gate 30 (FIG. 2) which coacts with a similar gate 32 in "seesaw" fashion under control of the switch motion detection system SMD. While gate 30 is inhibiting current switch status data, gate 32 allows passage of past history data, from a past history track 34 (FIG. 1) of the magnetic drum 10, to memory 18.

When motion of a switch, such as 16 has occurred, circuitry within the SMD system will generate a pulse which has a minimum prospective duration substantially equal to the time required for switch transfer to an adjacent position. In a working embodiment of the invention, this time happens to equal the time of one full program cycle. The circuitry will be described subsequently with reference to FIG. 3.

The pulse duration may be lengthened by further switch motion, for example by transfer to a further adjacent position, or operation of some other switch. The circuitry within SMD acts to tack pulses, so that the total duration of the resultant composite pulse is from the instant of detection of the first switch motion to detection of the last switch motion plus one full program cycle.

Presence of the switch motion pulse will assure continued inhibition of gate 30 and allowance of gate 32, but will qualify these gates for inversion of their conditions. Gate 30 will be inhibited and gate 32 allowed during the next input cycle of the program following termination of the composite switch motion pulse. During such one input cycle current switch position data will be entered into memory 18.

The SMD system also has facility for inverting the normal conditions of gates 30 and 32 every fifteenth cycle to permit updating switch status as pointed out previously. If a switch having three or more positions such as switch 16, is operated during an input cycle in which updating takes place, SMD will generate the switch motion pulse. Such pulse will be effective immediately to reinvert conditions of gates 30 and 32, so that past history is entered into memory. This is true whether the updating cycle is due to switch motion during a preceding cycle, or is due to fifteen cycle allowance of gate 30. Updating will take place during the input cycle following termination of the switch motion pulse, as above.

The input data reaching the memory, either past history or current are also recorded on the past history track 34 to become past history data for purposes of the next input cycle. The arrangement is such that a data bit associated with a given switch position is newly recorded in the same location on track 34 every input cycle, over the last previously recorded data bit for such given switch position.

With the above summary of the overall organization of the apparatus in mind, the full description will now be given. The magnetic drum 10 is illustrated in plane development and is assumed to be driven at constant speed in the direction indicated by the arrow. In a working embodiment of the invention, the drum rotates at 3600 revolutions per minute or 60 revolutions per second, and is furthermore divided into twenty channels each containing approximately five thousand instructions. The five thousand instructions constituting one channel are read in sequence during the course of one revolution, and then read and write head switching circuitry effects scanning of the next five thousand instruction channels. Thus the period for recursion for each channel is twenty revolutions or one-third second, and this is of course the period of one complete cycle. Accordingly, the fifteenth cycle recursion period for updating switch position data is three hundred revolutions or five seconds. The instruction rate is about 3 microseconds.

The parenthetical figures given for the Input, Compute, Output and SMNI in FIG. 1 reflect the approximate number of instructions allocated to these phases. It is evident that Input and SMNI combined require approximately one revolution, Compute approximately eighteen revolutions and Output one revolution. Therefore, the representation of Compute is necessarily compressed; one channel is shown for Compute and it is representative of the seventeen additional channels. The read and write heads indicated towards the bottom of the illustration should not be considered as all active at the same time. Rather the read and write heads associated with a given channel should be considered as active at one time. These simplifications in representation, as well as others to follow, are in the interest of clarity.

At the left end of the drum 10 are shown clock and marker tracks 36, which are shown as a unit for convenience. The associated read head 38 is thus actually a group of adjacent read heads, one assigned to each track. Groups of such adjacent read heads are designated by the symbol R within a circle. Moreover, it is assumed that this symbol also represents the usual read amplifier and pulse shaping circuits, one for each read head plus head switching circuitry. Similar considerations apply to the write heads, with the symbol W substituted for the symbol R. These devices are well understood in the art, and are therefore shown in simplified fashion.

The actual clock track, in accord with usual practice has prerecorded thereon magnetic patterns which are uniformly spaced around the drum periphery. The number of such magnetic patterns is equal to the number of instructions per channel, five thousand for the exemplary embodiment presented. Thus the clock track magnetic patterns or "pulses" may be assumed to be in horizontal alignment with instruction lines.

The actual marker track has prerecorded therein a single marker pulse which is utilized to mark beginning and end of a drum revolution, and accordingly establishing program phases and cycle counts. To this end, the read heads 38 are connected via plural lines indicated as a single cable 40 which leads to a unit 42, in which are included the usual clock pulse generation circuits read and write head switching circuits, cycle counters and controls. In the representation of line such as 40, it may be assumed that each such line is actually a cable composed of plural lines but it will be referred to in the singular.

The unit 42 provides the proper clock or timing pulses wherever required. Actual physical connection is not illustrated for simplicity. Line 44 is shown to be outgoing of unit 42 and is assumed to lead to the read and write heads to provide the appropriate timing and switching signals. One particular cycle counter 46 is shown separated from those contained within the unit 42; this counter is set each cycle by a pulse incoming from unit 42 via line 48. The counter 46 advances to count 15, and upon attaining count 15 resets itself to zero. At the same time a count 15 pulse CT15 is emitted and serves to set a flip flop 50. The flip flop, when set produces at its "0" output terminal the current data signal CD, which has a duration of one Input cycle; it is terminated after completion of the Input program of the current cycle, during the SMNI phase following such Input. The resetting is accomplished by an end of SMNI pulse applied via line 49 to the reset input terminal of flip flop 50. If desired, the "hardware" version of cycle counter 46 and flip flop 50 may be replaced by "software"; this would entail program instructions as part of the SMNI phase for the computer 20 to perform the logical operations necessary to augment account once a cycle count being stored in the memory 18, coupled with a further SMNI program instruction to clear the stored count of 15 to "0" coupled with generation of a signal equivalent to CD.

Each of the drum channels is provided with a group of adjacent tracks constituting an operation subchannel, and a group of adjacent tracks constituting an address subchannel, and a past history track, such as track 34 for the Input channel. This follows from the consideration that a program instruction consists of an operation command and the address of the operand. The number of tracks per subchannel is determined by the number of bits required to embrace the possible operations or addresses contemplated; typically for Input and Output two tracks are provided for the operation and fifteen tracks for the address. In Compute, the operation subchannel includes four tracks and the address channel fourteen.

The read heads are arranged in horizontal alignment. Write heads are provided for the past history tracks, and are in advance of the read heads, considered in the direction of drum rotation. The purpose of such displacement, and also the purpose of further recirculation register track 54, located at the right extremity of the drum 10 will be apparent subsequently.

The operation channel read heads are connnected via collective line 56 to an operation decoder 58, which generates a characteristic signal for each of the several operations code combinations. The operation decoder 58 is a diode matrix, per se well known in the art, and this is true of the remaining decoders encountered here. A decoding diode matrix is usually thought of as converting input bit combinations representing a particular character to a single signal corresponding to each character. Operations are also encoded by bit combinations. The matrix of itself cannot discriminate between characters and operations; hence operations are decoded in the same manner as characters.

The initial instruction of Input will be a command to preset a core address counter 60 to an initial value. This instruction is decoded by the operation decoder 58 and transmitted to the core address counter 60 via signal line 62. The subsequent commands of the input program will be "Input." The operation decoder senses the "Input" command and transmits a signal to the core address counter 60 via delay line 64. The core address counter 60 will be stepped by one, and this will be the core address for the switch position data bit addressed by the corresponding "Input" command. The core address signal is transmitted to the Input section of the core memory via line 66.

While the operations part of an input instruction is being sensed ultimately via line 66 at the Input section of the core memory 18, the address part of the instruction reaches a console selector 68 from the read head of the Input section address subchannel via gate 67 which may be assumed enabled at this time. The address part of the instruction is divided into two groups of bits, one reserved to select the consoles, and the remainder for the address in a particular console. Output lines to the several consoles are indicated collectively as 70 and it is assumed that the particular console presently addressed is that illustrated in FIG. 2 which is typical of the other consoles as well. The particular output line from the console selector 68 to the console of FIG. 2 is designated as 78.

Referring to FIG. 2, line 70A is seen to lead to an OR gate 72 and also a local address decoder 74. The fact of selection of the console is sensed as signal on line 70A and transmitted via OR gate 72 to a local clock pulse generator 76 which generates clock pulses for its console so long as the console is addressed. Local clock signals are supplied wherever they are required, but the connecting lines to generator 76 are omitted for simplicity. However, one particular clock pulse C1 is singled out because of its important contribution in the operation of the switch motion detection system SMD. The C1 pulse is a square wave train approximately in synchronism with the clock pulses derived from the clock track 36 (FIG. 1); exact synchronization of master and local clocks is unnecessary, so long as the permissible range of tolerance is observed.

The local address decoder 74 decodes the individual switch position addresses and transmits the addressing signals serially via address lines 78, of which only five are shown as representative. In a working embodiment of the invention, the number of addressed switch positions per console may be of the order of hundreds. Each of the outgoing lines 78 is connnected to an "AND" gate, the "AND" gates illustrated being numbered 79 to 83. Gates 79 to 83 obey positive logic rules. The description of interrogation of two-position switch 12 is exemplary for all other two-position switches. The movable arm of switch 12 is connected to a negative supply voltage —V, and its upper stationary contact is one input to the gate 79. With switch 12 "up," the gate is closed. With switch 12 "down," the switch exercises no control of the gate. When gate 79 is addressed, and switch 12 is down, a positive pulse appears at the gate output. This pulse terminates with termination of the address pulse, and at such time a flip flop 85 will be set. Note however, that switch "down" and setting of flip flop 85 implies a pulse sent to memory for data bit "0"; switch "up" and no setting of flip flop 85 implies no pulse sent to memory for data bit "1." A complementer incorporated in the memory buffer complements the data in the logical sense prior to storage in memory.

Since the interrogation gates are addressed serially, the output may be commoned without interference. Practical loading limitations restrict commoning to twelve "AND" gates per one flip flop in the vertical series 85, 86, etc. The common output of gate 79 and 80 and of ten additional gates, are connected to the set input of flip flop 85. The description of flip flop 85 followed by a pulse reshaper or reclocking means 87 leading to an "OR" gate 89 is representative of similar chains such as formed by flip flop 86, reshaper 88 and "OR" gate 89.

With regard to flip flop 85, the legend "LL" within the block identifies a type of flip flop which is set by the negative-going trailing edge of a positive pulse applied to its set terminal "S." When so set, its "1" output terminal will go positive, and its "0" output will go negative, assuming that the flip flop was previously reset. If these conditions had been established at the output terminals by a previous set pulse, the new set pulse will have no further effect. Resetting concurs with the negative-going trailing edge of a positive pulse applied to the reset terminal, and results in the "1" output terminal going negative and the "0" output terminal going positive, unless this condition had been established by a previous reset pulse.

It is therefore evident that a switch position data bit "1" will result in a set pulse, and will in fact find flip flop 85 in a reset condition and will therefore set it. A switch position data bit "0" will result in no set pulse and will therefore leave it reset. The signal from the "1" output terminal, in consequence of a sensed switch position data bit "0" is transmitted to the pulse reshaper 87, which also receives C1 clock pulse and accordingly produces an output signal that is synchronous with C1. This output signal is transmitted through "OR" gate 89. The output of "OR" gate 89 is coupled to the reset terminals of the flip flop in the series 85, 86; hence the trailing edge of each data bit "0" pulse outgoing from "OR" gate 89 will reset any then set flip flop. In view of the serial switch interrogation, only one such flip flop will be set, namely that which engendered the bit "0" pulse going through "OR" gate 89, and is now reset by the trailing edge of the very same bit "0" pulse. The output of "OR" gate 89 is also coupled via line 92 to a further "OR" gate 93 which also accepts the data bits of switches having more than two positions via line 94 in a manner subsequently described. It will be appreciated that in view of the serial interrogation, the lines 92 and 94 carry data bit signals nonconcurrently.

The output of "OR" gate 93 is coupled via line 95 to a still further "OR" gate 96 (FIG. 1) which at its other inputs, receives corresponding signals from the other consoles. The output of "OR" gate 96 leads via line 98 to the Input section of the core memory 18, and via line 100 ultimately to the past history track 34 which is associated with the Input section of magnetic drum 10. In regard to memory 18, it should be noted that buffers are shown within the block 18, and are interposed of the actual core memory storage and elements external of the memory 18. The memory 18 is conveniently loaded eight bits at a time; hence the buffers serving the Input section will parallelize eight bits before transfer to actual memory. At the Output section, the buffers serve to serialize a group of eight stored data bits. The data bits arriving via line 98, that is both data bits "0" in the form of physical pulses and data bits "1" in the form of no pulses are stored in the Input section of the memory 18 to await the computing phase. The delay time for the delay devices 64 is selected for proper concurrence at the core memory 18 of the core address resulting from a given Input instruction line, and the data bit resulting from the same given instruction line.

The switch position data bit with outgoing of "OR" gate 96 is transmitted via line 100 to a write head 102 of the recirculation register track 54 of drum 10, and is recorded by write head 102. An associated read head 104 is displaced from write head 102 in the direction of drum rotation so that the bit recorded by write head 102, reaches read head 104 after a delay, which may be typically one hundred instruction lines. The read out bit is transmitted via line 106 and arrives at the write head 108 of the past history track 34 at the proper time for updating the past history. In other words, a given instruction line had been under the read heads of the Input section previously, and in particular the previous past history bit of such instruction line had been at the read head 110 of the past history track 34. This instruction had engendered the data bit incoming to write head 108. The write head 108 records the new past history bit at the time that the previous past history bit of the engendering instruction line is under the write head 108. The heads 108 and 110 are also displaced by about one hundred instruction lines. It should be noted that the new past history bit is recorded over the previous past history bit, even if both such bits are "1" or are "0." In contrast, in updating the past history tracks of the Compute and Output sections of the drum, recording takes place only in the case of a new "1" over a previous "0," or vice versa.

Returning to the consideration of switch interrogation, the description applicable to the three-position switch 16 (FIG. 2) is representative of the considerations applicable in general to switches having more than two positions. It should be noted that if desired, two-position switches may be interrogated in the same manner as switches having more than two positions.

Referring to FIG. 2, the movable contact of switch 16 is energized by the reference voltage —V, and as illustrated, engages stationary contact 16*a*. Its other stationary contact 16*b* and 16*c* are presently disengaged. The three fixed contacts 16*a*, 16*b*, 16*c* are connected to respective "AND" gates 81, 82 and 83, each of which had an addressing line input from the local address decoder 74. The gates 81, 82, 83 operate in a manner entirely analogous to that of gates 79 and 80, but it is seen that in contrast to the switches 12 and 14, each of the switch contacts 16*a*, 16*b*, 16*c*, is treated as though it were a two-position switch. Contacts of further switches would be similarly connected to respective "AND" gates such as 81 etc.

Comparison of the elements onward of the gates 81 etc. with those onward of the gates 79 etc. indicates identical configurations. The elements following the gates 81 etc. are labeled with the same reference numeral as the corresponding elements following gates 79 etc., followed by a subscript "*a*," so that a detailed description is unnecessary. The output of "OR" gate 89*a* instead of being coupled to "OR" gate 93, is coupled via line 114 to the input of the inhibit-allow gate 30 which is normally inhibited by the action of SMD as previously described. Thus the current switch position data normally do not reach "OR" gate 112 via inhibit-allow gate 30.

Instead, the "OR" gate 112 normally passes past history data received from allow-inhibit gate 32, which is also controlled by SMD in the manner previously described. Past history data arrive at the input of gate 32 via line 116 which is connected to the past history read head 110 (FIG. 1). The "OR" gate 112 transmits data via line 94. The data flow onward of gate 93 has been described previously.

The contacts such as 16*a*, 16*b* etc., in addition to their connection to the respective gate 81, 82 83 are also connected to respective switch action detectors (SAD). The SAD units are basically resistance-capacitance differentiating networks as indicated in the block 122*c*, followed by amplification suitable to meet the loading requirements of an "OR" gate 124 which in the illustrated form receives inputs not only from networks 122*a*, 122*b*, 122*c*, but from the remaining SAD networks of the console. It should be understood, that as a practical matter, the "OR" gate 124 may be a cascade of "OR" gates; typically approximately one hundred SAD networks may be served by one "OR" gate; where more switch positions are to be interrogated, two or more "OR" circuits may themselves be OR'ed. When the movable contact of a switch such as 16 engages a new position, say 16*b*, the SAD 122*b* will emit a differentiated spike through "OR" gate 124 into SMD to initiate therein the switch motion pulse adverted to previously and discussed in greater detail in the description of FIG. 3. SMD also receives the signals CD and C1. Further, SMD receives control signals from the local address decoder 128 used principally for Output, but also during the SMNI phase of a program. As a matter of fact, the control signals from decoder 128 are applied to SMD via plural lines 130 during the SMNI phase in a manner subsequently described.

As previously stated, the operation decoder 58 (FIG. 1) receives the operation part of a program instruction line via line 56 from the operation read heads of each of the Input, Compute and Output sections of the drum 10. The Compute instructions are transmitted from the operation decoder 58 via line 140 to the computer 20. The nature of the instructions, and the manner of their execution has been described previously. The computer 20 communicates bidirectionally with each of the three sections of the core memory via bidirectional lines 142, 144 and 146, and also communicates with the accumulator register 22.

While the operation part of a program instruction reaches the computer 20 ultimately via line 140, the address part of the Compute instruction is sensed by read heads 150, and transmitted via line 152 to that one of the three sections of the core memory 18 as is proper to the given instruction.

Record is kept of the computed value of each instruction for recording in the past history track of the Compute section of the drum. To this end a line 160 outgoing of the computer 20 connects to comparator logic circuitry 162 which compares the incoming bit with the previous past history bit incoming via line 164, whose origin is at the read heads of the past history tracks of the Compute section and also the Output section. The circuitry 162 includes in addition to a bit comparator, the necessary logic circuitry to actuate the printer 26. The printer 26 is called on to print out messages in instances of changes of the value of the recorded bit, not necessarily on all such instances. The comparator within block 162 senses inequality of the signals on incoming lines 160 and 164 and transmits the newly incoming value only in case of inequality to the printer 26, and also to a write head 168 of the recirculation register track 154. The write head 168 is arranged to record either a new 0 or a new 1, and otherwise to erase to blank. A companion read head 170 is displaced from the write head 168 in the direction of drum rotation along the track 54. The read head 170 accordingly reads out only newly recorded bits either 1 or 0, and these are transmitted via lines 174 to the write heads of the past history track of the Compute section or the Output section, as may be proper in the given situation. The channeling to the correct write heads is under control of the head switch circuit within block 42. The new bits are recorded in the appropriate past history tracks in the portion of the instruction line that had engendered such new bits, necessarily over their corresponding previous past history bits. Where the write head 168 has erased to blank no signal is transmitted via lines 164 and the previous past history bit remains unchanged.

Considering the Output phase, the operation bit of the instructions reaches the operation decoder 58 via line 56, onward of which the chain of events is the same as during Input, except that the core address counter 60 now is stepped with each "output" instruction. Output data are read out from the core memory 18 via line 180 which reads to a console selector 182 that is entirely analogous to the console selector 68 utilized for the Input phase. The console selector 182 receives the address bits of the corresponding instruction via line 184, and the data bit incoming via line 180 is routed to the proper console via the proper one of the output lines 186 together with the local address at such console. In this instance it is assumed that the proper console is that shown in FIG. 2, as that the output bit together with the local address are transmitted via output line 186*a* to the local address decoder 128 utilized on Output and also to OR gate 72 to set in motion the local clock 76 also on Output.

The decoder 128 (FIG. 2) addresses the appropriate one of the lamps 24 to light or continue to light, or to extinguish or continue to extinguish the same. Thus, the decoded addresses are essentially the lamp themselves. Actually the lamps 24 are actuated by LL type flops assumed to be contained in unit 128. As a matter of fact the legend LL points to the fact that this type of flip flop is used for lighting lamps.

Referring again to FIG. 1, the line 180 outgoing of the output section of the memory 18 is seen also to branch off at 180*a*, which latter line merges with line 160 leading to the comparator logic circuitry 162. This permits up-dating of the past history track of the Output section in the manner previously described.

This leaves the SMNI phase to be considered. It will be recalled that this phase takes place in part before Input and in part subsequent to Input. It is sensed by the Input read heads. The true Input instructions result in interrogation of switches. Output instruction on the other hand results in addressing devices, the lamps 24 for example. It so happens that SMNI, although physically recorded on the Input sections of the drum 10, is composed of Compute and Output instructions. This necessitates segregation for proper channeling of the instructions read out from the Input section of the drum, a function that is performed by gate 67 previously mentioned and two further gates 190 and 192 in cooperation with the operation decoder 58. When the decoder 58 receives a true Input instruction, a signal is transmitted over outgoing line 194 which inhibits gates 190 and 192 and enables gate 67. Accordingly the address part of the instruction passes through gate 67 and reaches the console selector 68. If on the other hand a Compute instruction, originating at SMNI, is sensed by the decoder 158 line 194 transmits a signal which inhibits the gate 67 and 192, and enables gate 190. Accordingly the address bit of the instruction passes through gate 190 to line 198, which merges with the Compute address line 152 to lead to the core memory 18.

In the case of an output type instruction originating at SMNI the decoder 58 transmits a signal which inhibits gates 190 and 67 and allows gate 192. Accordingly the address bit of the instruction passes through gate 192 and reaches the output console selector 182 via line 202. The proper console and address is reached via the appropriate output line 186 and the appropriate local address decoder 128 (FIG. 2) in the same manner as normal Output. The further description of SMNI will be given in connection with the description of FIG. 3 which now follows.

Figure 3:
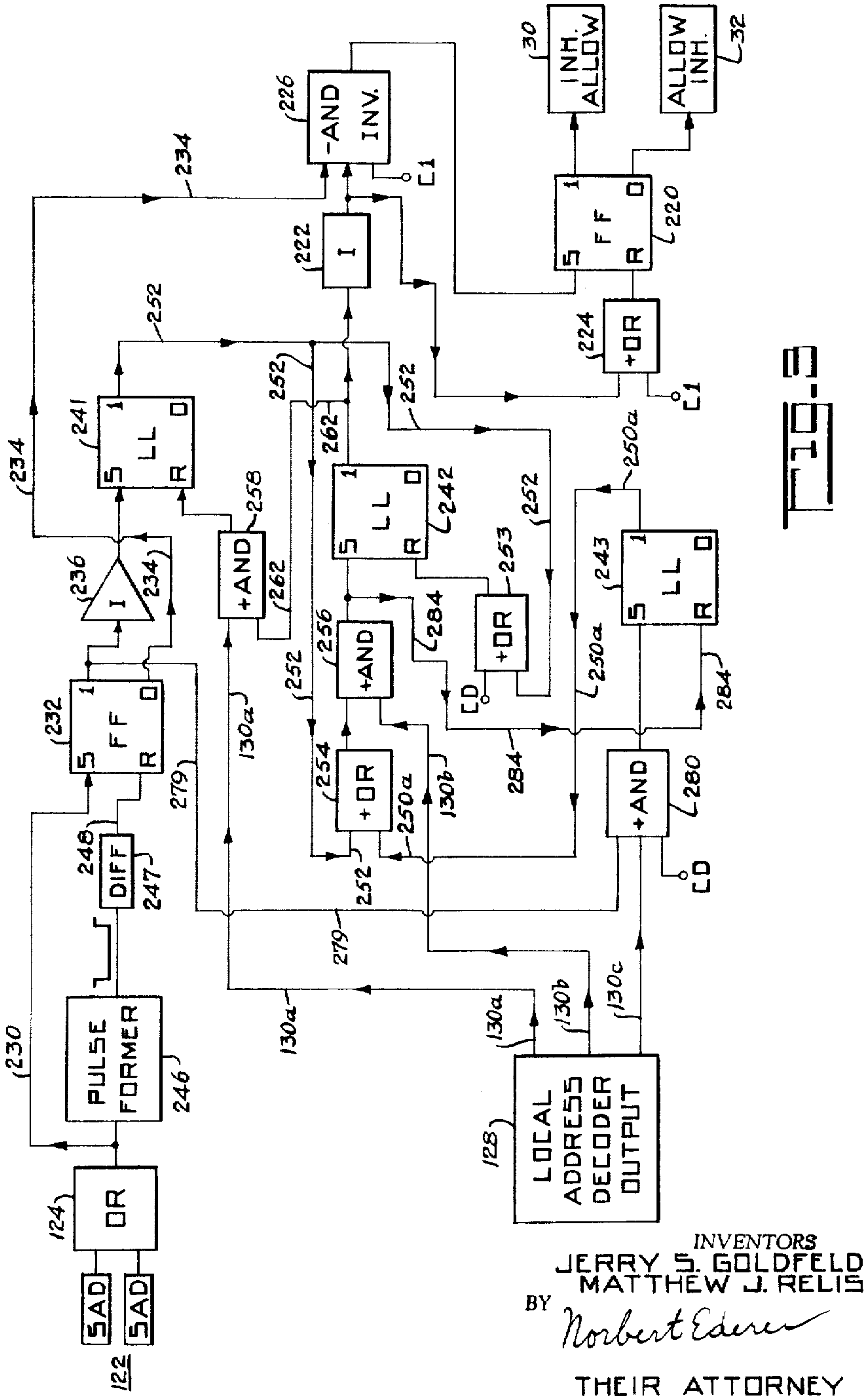
FIG. 3 is a block diagram of the switch motion detection (SMD) system of FIG. 2.

Referring to FIG. 3 for a description of internal organization of the switch motion detector SMD, the following elements illustrated in FIG. 2 are repeated here for convenience; inhibit-allow gate 30 and allow-inhibit gate 32, SAD networks 122 and "OR" gate 124 and local decoder (Output) 128. The line 130 outgoing of unit 128 in FIG. 2 is represented in FIG. 3 as three lines 130*a*, 130*b* and 130*c*.

The gates 30 and 32 are under control of a flip flop 220 which also bears the legend FF to identify a type of flip flop meeting the following requirements. The flip flop is set when the level at its "S" input terminal is positive and under these conditions its "1" output terminal will be negative and its "0" output terminal positive. The flip flop is reset by application of a positive level to its "R" input terminal, and when reset its "1" output terminal will be up and its "0" output terminal will be down. Normally the flip flop 220 is reset; the negative level from its "0" terminal allows gate 32 to pass past history data while the positive level from its "1" terminal inhibits passage of current switch position status data through gate 30. In the set condition these relations are inverted. This normal situation is usually established by the normal positive level appearing at the output of an inverter 222 which is applied as input signal to both positive "OR" gate 224 and negative AND gate 226 which also includes an inverter. The normal positive level is transmitted via "OR" gate 223 to the "R" input terminal flip flop 220 to maintain its reset state; at the same time the negative "and" condition of gate 226 is violated; having regard to the inversion, the output of gate 226 is down to prevent flip flop from setting. These conditions prevail when the disclosed system is a normal cycle that is not in a count 15 current data cycle, and no switch having three or more positions has been operated for some time.

Consider the situation of switch action as sensed by one of the switch action detectors 122. The "OR" gate 124 includes inverting circuitry so that the resultant differentiated spike appears positive at the output of gate 124 as shown above connecting line 230, which leads to the "S" terminal of an FF type flip flop 232, to set it. The "0" terminal of flip flop 232 will go up and such level is transmitted via line 234 to the input of gate 226, violating its negative "and" condition. If flip flop 220 happens to be set at this instant under circumstances subsequently discussed—note that this implies passage of current switch status data—the next positive going portion of a clock pulse C1 will be transmitted through "OR" gate 224 to reset flip flop 220; this inhibits gate 30 once more and enables gate 32 so as to produce immediate reversion to past history data.

As a result of the setting of flip flop 232, its "1" terminal goes negative; this negative signal is inverted by inverter 236 which accordingly transmits a positive signal to the "S" input terminal by a LL type flip flop 241. The latter flip flop is not set at this time; recall that it will set at the trailing edge of the just incoming positive signal. This will occur when flip flop 232 resets. The resetting of flip flop 232 is engendered by the very same differentiated output signal from "OR" gate 124 which had set flip flop 232 at the beginning of switch motion.

The output of "OR" gate 124 is also applied to a pulse former 246 which is of the type known in the art as a retriggerable pulse generator or retriggerable delay flop. In response to the input spike, the pulse former 246 will generate the negative timing signal indicated at its output and this signal has a prospective minimum duration substantially equal to the time required for one complete program cycle, and preferably somewhat greater than the time for one cycle. The pulse former 246 is retriggerable, that is, it is capable of tacking timing pulses. Assume that a timing pulse has been generated and is still persisting. Suppose another switch motion output signal arrived from "OR" gate 124. The already commenced timing signal will terminate prospectively the normal timing period hence, that is approximately the time of one complete cycle subsequently, and so forth for any further switch motion signals that may appear while the timing pulse persists. The negative timing signal is transmitted via a differentiating network 247 to the "R" terminal of flip flop 232. The network 247 will produce a negative spike at the termination of the timing pulse, so that flip flop 232 will reset at such termination. In view of the fact that flip flop 220 will remain reset for so long as flip flop 232 is set, it is readily seen that the action of the pulse former 236 assures that current switch position data cannot be passed by gate 30 for a minimum period equal to the time required for one program cycle.

When flip flop 232 finally resets at the termination of the timing pulse from pulse former 246, the gate 226 will be primed to permit setting of flip flop 220; this does not happen as yet because the inverter 222 is still delivering positive signals. However, LL type flip flop 241 will be set with the termination of the timing pulse. As a result its "1" output terminal will go positive and such positive level is transmitted via line 252 to the "R" of a second LL type flip flop 242; to prime the latter flip flop for resetting upon resetting of flip flop 241. This is of no moment presently in any event, as flip flop 242 will normally be presently reset to begin with.

The positive output signal on line 252 is also transmitted to, and therefore passed by a positive "OR" gate 254 to an input of a positive "and" gate 256 which is presently blocked for the following reason. Its second input line is line 130*b* from the local address decoder 128. This line, and also line 130*a* are normally negative so as normally to block gate 256 and a further positive "and" gate 258 which connects to the "R" terminal of the presently set flip flop 241.

In the next cycle, during that part of the SMNI phase which precedes Input, a positive addressing pulse will be transmitted from the decoder 128 via line 130b to gate 256, and the trailing edge of this pulse sets the flip flop 242. The resultant positive pulse at the "1" terminal of flip flop 242 is transmitted via line 262 to prime gate 258 for eventual resetting of flip flop 241 and is also applied to the inverter 222 which accordingly delivers a negative signal to negative "AND" gate 226, and also positive "OR" gate 224. Since line 234 incoming to gate 226 is now also negative, the negative "and" condition will be satisfied with each negative portion of the clock pulse C1, opening gate 226 and setting the flip flop 220, enabling gate 30 to pass current switch position data and inhibiting passage of past history data through gate 32. However, the positive half portion of each C1 clock pulse is transmitted by "OR" gate 224 and resets flip flop 220. Therefore, the flip flop 220 alternates between the set condition, with the negative half cycles of C1, in synchronism with data pulses through gate 30, and the reset condition. The importance of this point must not be overlooked. Should gate 226 be blocked for any reason at any time, and here particularly because of new switch motion as reflected by setting of flip flop 232, the positive part of the next C1 clock pulse will reset flip flop 220 and this results in immediate reversion to past history data through gate 32. Negative part of the next C1 pulse will not pass through gate 226 leaving flip flop 220 reset.

Assume that flip flop 220 is alternating between set and reset conditions so as to enable gate 30 to pass current switch position data during the Input phase now under consideration. During the SMNI phase following such Input phase, the decoder 128 will address gate 258 by a positive pulse via line 130a, and with the termination of this pulse flip flop 241 will be reset. Its "1" terminal and line 252 and "OR" gate 253 coupled to line 252 will go down so that flip flop 242 will also be reset. It is noted particularly, that the setting of flip flop 241 had primed flip flop 242 for setting; the setting of flip flop 242 had primed flip flop 241 for resetting; and now the resetting of flip flop 241 resets flip flop 242. Thus we have the strange situation of one flip flop pulling another flip flop.

With flip flop 242 now reset, the output of inverter 222 is up; this insures that flip flop 220 remains reset. We have now reverted to the initial conditions, so that the next Input cycle will be a normal past history data cycle unless another switch is thrown or the next Input phase happens to be a count 15 cycle.

The effects of operation of a new switch while the negative pulse from pulse former 246 persists has been described previously. The operation of a new switch subsequent to termination of such timing pulse will result in blocking of gate 226 and resetting or continued resetting of flip flop 220; this has also been pointed out previously. However, a little thought will convince the reader, that the remaining elements of FIG. 3 so far discussed will be subjected to the same chain of events as before, and during the Input phase following termination of the just generated timing pulse from pulse former 246, gate 30 will once more be enabled to update switch position status.

The action of the elements of FIG. 3 so far described, is individual to each console. On the other hand an update Input phase during a count 15 cycle is common to all consoles. Assume first that there has been no switch motion recently, so that the "1" terminal of flip flop 232 is positive. Line 279 couples this positive potential to a positive "AND" gate 281. During the SMNI phase preceding a fifteenth Input cycle the CD signal is generated. It is applied to the positive "AND" gate 280 to prime the same. During this very same SMNI phase the line 130c from decoder 128, and shortly thereafter line 130b will be addressed with positive pulses. The pulse on line 130c is gated through gate 280 and reaches the "S" terminal of a further LL type flip flop 243, which is set at the termination of the address pulse on line 130c. The resulting positive signal at the "1" terminal of flip flop 243 is applied via line 250a to the positive "OR" gate 254 and therefore reaches positive "AND" gate 256. The almost immediately following address pulse on line 130b is passed through gate 256, and its trailing edge will set flip flop 242, and will also reset flip flop 243 via line 284, which interconnects the output of gate 256 and the "R" terminal of flip flop 243. Thus the flip flop 243 is set for just a very short time. It is readily seen that all the conditions for passing current switch status data through gate 30 are satisfied. The operation will be the same as in the above discussed situation beginning at the point where flip flop 242 was initially set. This is subject to the qualification that the flip flop 242 in this instance is reset by the termination of the CD signal which is applied to its reset terminal through "OR" gate 253.

Assume on the other hand that at the time of setting of flip flop 243, flip flop 232 had been set; that is, the timing pulse from pulse former 246 had been persisting. In this instance the "1" output from flip flop 232 will be down; gate 280 will not pass CD, so that flip flop 243 will not be set. Hence flip flop 242 will not be set during the current cycle. When flip flop 232 is ultimately reset by termination of the timing pulse, flip flop 241 will set, and will insure that current data will pass through gate 30 during the next inut phase.

In the situation where a fifteenth cycle also happens to be a cycle following termination of the timing signal, both flip flops 241 and 243 will be set to condition setting of flip flop 242, with the attendant passage of current data. Also, flip flops 241 and 243 will be reset as usually, independently of one another.

In conclusion, it is pointed out that the switches contemplated by the present invention may be operated by a human operator, may be motor driven, or may be relay switches. In a working embodiment of the invention all three types of switches are encountered. The invention, among its other obvious uses, is particularly useful as a training device in training human operators to perform a complicated switching routine on the basis of the indications provided by the lamps 24.

The invention has been described by reference to one particular embodiment thereof, but it should be understood that it is not limited to the specifically described features. Modifications may occur to those skilled in the art and it is intended to embrace all such modifications as fall within the true spirit and scope of the invention as set forth in the following claims.

What is claimed is:

1. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal signifying such motion; means responsive to the latter signal for entering current switch position data during a cycle subsequent to that in which said latter signal had been initiated; and means responsive to switch motion signifying signal during a current data entry cycle for immediately blocking further entry of current history data.

2. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal having a minimum duration of substantially one cycle and signifying such motion; means responsive to the latter signal for blocking during said cycle entry of current switch position data and for entering said data during a cycle subsequent to that in which said latter signal had been initiated; and means for disabling the blocking means periodically for one cycle to cause during such one cycle entry of current history switch data into said storage means.

3. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal signifying such motion; means responsive to the latter signal for entering current switch position data during a cycle subsequent to that in which said latter signal had been initiated; means for disabling the blocking means periodically for one cycle to cause during such one cycle entry of current history switch data into said storage means; and means responsive to switch motion signifying signal during a cycle in which current history is entered, for immediately blocking further entry of current history data.

4. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal having a minimum duration of substantially one cycle and signifying such motion; means responsive to termination of the latter signal for enabling entry of current switch position data into said storage means; and means responsive to initiation of switch motion signifying signal during a current data entry cycle for immediately blocking further entry of current history data.

5. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal having a minimum duration of substantially one cycle and signifying such motion; means responsive to termination of the latter signal for enabling entry of current switch position data into said storage means; means under control of said switch motion detection means for disabling, in absence of switch motion signal, the blocking means periodically for one cycle to cause during such one cycle entry of current history switch data into said storage means; and means responsive to initiation of switch motion signifying signal during a cycle in which current history is entered, for immediately blocking further entry of current history data.

6. Switch position scanning apparatus comprising means for scanning in each of repeated cycles, in sequence a plurality of positions of multi-position switches as distinguished from two-position switches and producing switch position data signals; storage means having a plurality of storage positions in which are stored past history switch position data; means normally blocking entry of current switch position data into said storage means; switch motion detection means including a retriggerable pulse generator for producing in response to switch motion a signal having a minimum prospective duration of substantially one cycle and signifying such motion, and for tacking to a previously commenced switch motion signal, in response to each new switch motion, a like switch motion signal, so that the composite switch motion signal terminates as a minimum at substantially one cycle after the end of the last switch motion; means responsive to initiation of said composite signal during a cycle in which current data is entered for blocking further entry of said data and means responsive to termination of the latter signal for enabling entry of current switch position data into said storage means.

7. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means including a retriggerable pulse generator for producing in response to switch motion a signal having a minimum prospective duration of substantially one cycle and signifying such motion, and for tacking to a previously commenced switch motion signal, in response to each new switch motion, a like switch motion signal, so that the composite switch motion signal terminates as a minimum at substantially one cycle after the end of the last switch motion; means responsive to termination of the latter signal for enabling entry of current switch position data into said storage means; and means responsive to initiation of switch motion signifying signal during a current data entry cycle for immediately blocking further entry of current history data.

8. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means including a retriggerable pulse generator for producing in response to switch motion a signal having a minimum prospective duration of substantially one cycle and signifying such motion, and for tacking to a previously commenced switch motion signal, in response to each new switch motion, a like switch motion signal, so that the composite switch motion signal terminates as a minimum at substantially one cycle after the end of the last switch motion; means responsive to termination of the latter signal for enabling entry of current switch position data into said storage means; means under control of said switch motion detection means for disabling, in absence of switch motion signal, the blocking means periodically for one cycle to cause during such one cycle entry of current history switch data into said storage means; and means responsive to initiation of switch motion signifying signal during a cycle in which current history is entered, for immediately blocking further entry of current history data.

9. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal having a minimum duration of substantially one cycle and signifying such motion; means responsive to termination of the latter signal for enabling entry of current switch position data into said storage means during the next complete cycle following such termination; and means responsive to initiation of switch motion signifying signal during a current data entry cycle for immediately blocking further entry of current history data.

10. Switch position scanning apparatus comprising means for scanning in each of repeated cycles, in sequence a plurality of positions of multi-position switches as distinguished from two-position switches and producing switch position data signals; storage means having a plurality of storage positions in which are stored past history switch position data; means normally blocking entry of current switch position data into said storage means; switch motion detection means producing in response to switch motion a signal having a minimum duration of substantially one cycle and signifying such motion; means responsive to termination of the latter signal for enabling entry of current switch position data into said storage means during the next complete cycle following such termination; means responsive to initiation of the switch motion signifying signal during a current data entry cycle for immediately blocking further entry of current switch data; and means for disabling the blocking means periodically for one cycle to cause during one cycle entry of current history switch data into said storage means.

11. Switch position scanning apparatus comprising means for scanning in each of repeated cycles, in sequence a plurality of switch positions and producing switch position data signals; storage means having a plurality of storage positions in which are stored past history switch position data; means normally blocking entry of current switch position data into said storage means; switch motion detection means producing in response to switch motion a signal having a minimum duration of substantially one cycle and signifying such motion; means responsive to termination of the latter signal for enabling entry of current switch position data into said storage means; means under control of said switch motion detection means for disabling, in absence of switch motion signal, the blocking means periodically for one cycle to cause during such one cycle entry of current history switch data into said storage means during the next complete cycle following such termination; and means responsive to initiation of switch motion signifying signal during a cycle in which current history is entered, for immediately blocking further entry of current history data.

12. Apparatus for processing switch position data obtained by interrogating a plurality of terminal positions of multi-position switches as distinguished from two-position switches in repetitive cycles comprising:

(a) a program storage device for storing a cyclically repeatable program that includes an input phase in which switch positions are to be addressed, a compute phase in which switch position data are to be processed, and an output phase in which output devices are to be addressed and actuated in accord with the computed results, (b) a data storage memory under control of said program storage device for storing switch position data obtained during an input phase, and computed data obtained during a compute phase, (c) a computer coacting with said memory and under control of said program storage device for operating on switch position data stored in said memory and for delivering computed data to it for storage, (d) means for storing past history switch position data and providing access to the latter in correspondence with respective input phase program instructions, (e) means under control of said program storage means for sequentially addressing, during an input phase, the switch positions in sequence and producing current switch position data, (f) selector means for channeling to said memory and to said past history storage device, alternatively past history data and their respectively corresponding current data, and normally selecting the former, and blocking the latter, (g) switch motion detection means, including a delay device, responsive to switch motion for actuating, after delay subsequent to termination of switch motion, said selector means for channeling in a subsequent input phase current data and blocking past history data, said switch motion detection means, responsive to new switch motion while current data are being channeled, for immediately once more channeling past history data and blocking current data; and (h) means under control of said program storage means for transferring, during an output phase computed data to their respective output devices to actuate the latter accordingly.

13. Apparatus according to claim 12, further provided with means for counting cycles of said program storage means, and means responsive to the cycle counting means attaining a predetermined count of actuating the selector means for channeling current data and blocking past history data.

References Cited by the Examiner

UNITED STATES PATENTS

| | | | |
|---|---|---|---|
| 2,377,783 | 5/1945 | Hood | 235—61.6 |
| 2,924,666 | 2/1960 | Brooks et al. | 179—18 |
| 2,969,522 | 1/1961 | Crosby | 340—172.5 |
| 3,063,036 | 11/1962 | Reach et al. | 340—172.5 |
| 3,099,819 | 7/1963 | Barnes | 340—172.5 |

ROBERT C. BAILEY, *Primary Examiner.*

R. M. RICKERT, *Assistant Examiner.*